Feb. 27, 1940.   S. H. CALDWELL   2,191,516
TACTUAL SIGNAL
Filed May 24, 1937
FIG. I.
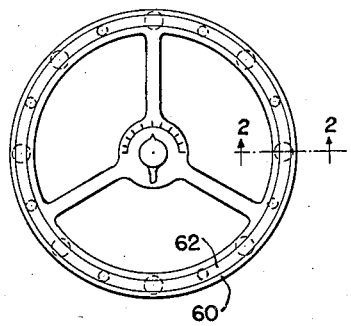
FIG. 2.
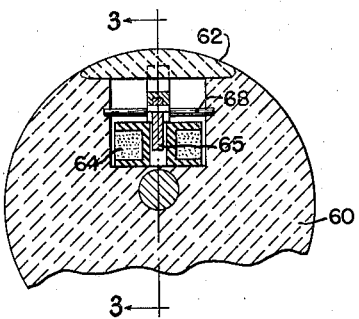
FIG. 3.
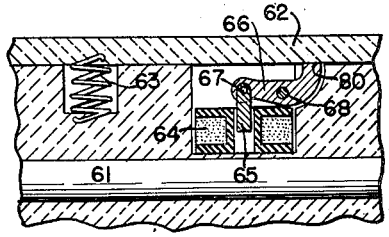
INVENTOR
STUART. H. CALDWELL.
BY
ATTORNEYS Patented Feb. 27, 1940

2,191,516

UNITED STATES PATENT OFFICE 2,191,516

TACTUAL SIGNAL

Stuart H. Caldwell, Detroit, Mich., assignor to Kelch Heater Company, Detroit, Mich., a corporation of Michigan Application May 24, 1937, Serial No. 144,524

4 Claims. (Cl. 177—324)

My invention relates to indication of vehicular speed and more particularly to tactual indication of vehicular speed.

It is an object of my invention to provide a speed indicating system in which the indication of speed is accomplished by invisible, inaudible tactual signal means associated with a control member of the vehicle.

It is a further object of the invention to provide a movable section in a control element of the car.

In the past it has been common practice to provide a speed warning signal in connection with motor vehicles which will operate to flash a light or to sound an audible signal. It has also been suggested to provide in connection with motor vehicles a speed responsive means which will at once indicate excessive speed by an audible or visual signal and at the same time either limit the speed to the predetermined setting or automatically and positively reduce the speed of the vehicle. My invention contemplates a departure from the previously known methods of speed signaling. It will be seen that it is undesirable and oftentimes dangerous to provide means responsive to the speed of the vehicle which will positively reduce the speed instantly upon attainment of the excessive speed. Oftentimes in driving a motor vehicle on the highways it is necessary to increase the speed for intervals in order to avoid dangers. My improved signaling system is characterized in one of its aspects by the fact that while it warns the operator of the vehicle that he has exceeded a predetermined speed, it in no way interferes with the operation of the vehicle. If the operator so desires, or if the situation so demands, the speed of the vehicle can be further increased within the capacity of the vehicle.

Another aspect of my invention lies in the fact that the signal is invisible and inaudible. It will therefore communicate the fact that a predetermined speed has been reached or exceeded only to the operator of the vehicle.

Another advantage of my improved system resides in the fact that the signal is not adapted to startle the operator or to distract his attention from the vehicle. On the contrary, it will more or less gradually attract his attention and permit him to decrease the speed if he so desires without relaxing his attention from operation of the car.

Further objects will be apparent on reading the following detailed description taken in conjunction with the accompanying drawing in which Fig. 1 is a plan view of a steering wheel embodying another form of my invention;

Fig. 2 is a section on the lines 2—2 of Fig. 1;

Fig. 3 is a section on the lines 3—3 of Fig. 2.

The signaling device is illustrated in Figs. 1, 2 and 3. A suitable speed or condition responsive switch controls the circuit to the device. This form of signaling apparatus comprises a movable section 62 built into the steering wheel of the vehicle 60. The steering wheel 60 provided with a reinforcing member 61 has a channel formed therein to receive the signal actuating mechanism. As will be clearly seen in Figs. 2 and 3, the section 62 is urged to a position abutting the steering wheel by a tension spring 63. Suitable recesses are provided around the periphery of the wheel to receive solenoids 64. These solenoids are adapted to attract armatures 65. Pivotally connected to armatures 65 at 67 are bell crank levers 66. These bell crank levers are also pivoted to a fixed pivot 68 in the steering wheel. The end 80 of the bell crank lever is adapted to abut the movable section 62. Upon the circuit being completed through the solenoids 64 the armatures 65 are attracted downwardly, thus pivoting the bell crank levers 66 about their fixed pivot 68 and causing end 80 to bear against movable section 62 and to raise this section a small distance.

This signal is particularly well adapted for a speed indicating signal. Whenever the operator of a motor vehicle is proceeding at relatively high speeds, his attention is concentrated on steering the car and therefore directly upon the steering wheel. A signal adapted to operate through the medium of the steering wheel is thus particularly well adapted to be used as a speed indicator. The particular form of indicator herein disclosed, that is, a small section movable relatively to the surface of the wheel a short distance is designed to attract the attention of the driver without alarming or startling him and without distracting his attention from his task at hand. It will, of course, also be noted that this signal is inaudible and invisible, and will serve as an indication to the operator of the vehicle only and to no other persons when he is exceeding the speed limit.

While I have illustrated and described various preferred embodiments of my invention, it will be apparent to those skilled in the art that various additions, omissions, substitutions and modifications may be made within the scope of my invention, as indicated by the appended claims.

What I claim as my invention is:

1. A control member adapted to serve as a tactual signal comprising a pair of similarly shaped abutting members adapted to be gripped at various places throughout their extent, said members, when abutting, presenting a substantially smoothly rounded cross section, one of said members being provided with a plurality of recesses, resilient means in some of said recesses connecting said members and urging them together, and motor means in other of said recesses adapted to separate said members uniformly throughout their extent.

2. A control member adapted to serve as a tactual signal comprising a pair of similarly shaped abutting members adapted to be gripped at various places throughout their extent, said members, when abutting, presenting a substantially smoothly rounded cross section, one of said members being provided with a plurality of recesses, resilient means in some of said recesses connecting said members and urging them together, and motor means in other of said recesses adapted to separate said members uniformly throughout their extent, said resilient means and said motor means being arranged alternately.

3. A control member formed of two similarly shaped registering members, one of said members having a recess therein, said other member adapted to abut said recess; motor means comprising a solenoid and lever in said recess, said solenoid having a movable core; said lever pivotally mounted in said recess, operably connected to said core, and having a free end engaging said other member; the arrangement being such that upon energization of said solenoid, said members will be separated.

4. A control member formed of two similarly shaped registering members, one of said members having a recess therein, said other member adapted to abut said recess; motor means comprising a solenoid and lever in said recess, said solenoid having a movable core; said lever pivotally mounted in said recess, operably connected to said core, and having a free end engaging said other member; the arrangement being such that upon energization of said solenoid, said members will be separated; and means engageable with said motor means to limit separation of said members to a predetermined amount.

STUART H. CALDWELL.